Dec. 13, 1949 W. S. BOEDECKER ET AL 2,491,440
APPARATUS FOR FLAME CUTTING METAL
Filed Feb. 5, 1947
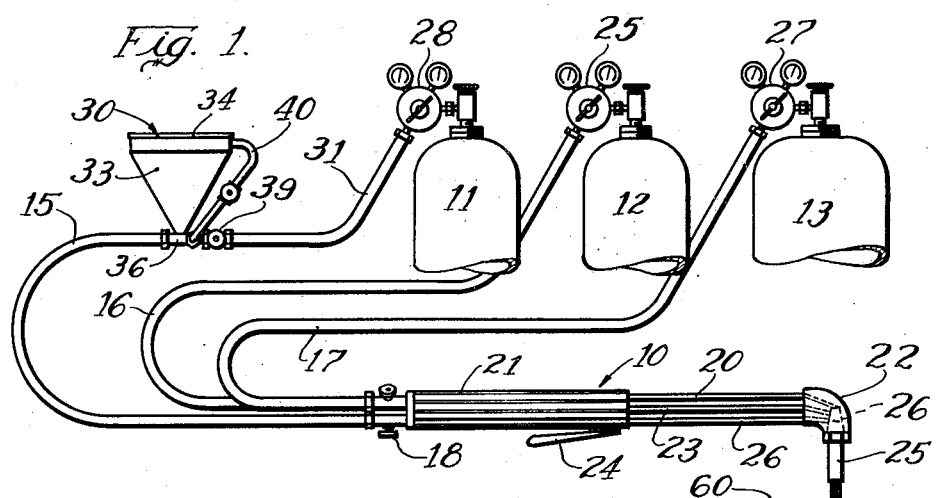
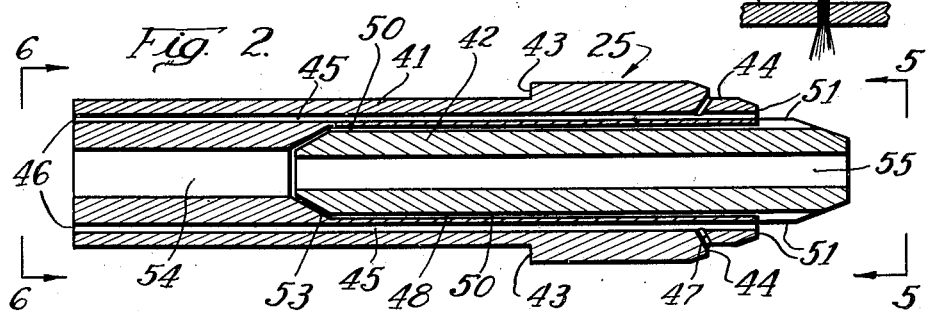
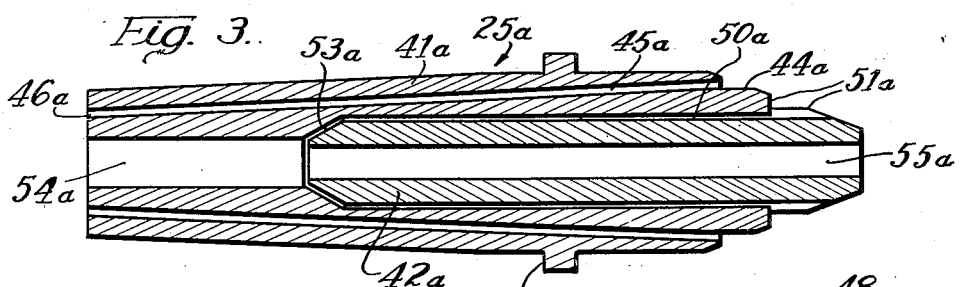
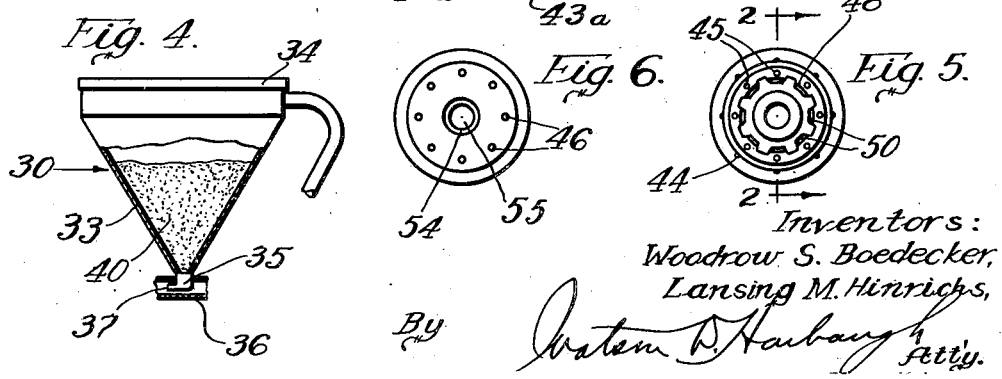
Inventors:
Woodrow S. Boedecker,
Lansing M. Hinrichs,
By Watson D. Harbaugh Atty.

Patented Dec. 13, 1949

2,491,440

UNITED STATES PATENT OFFICE 2,491,440

APPARATUS FOR FLAME-CUTTING METAL

Woodrow S. Boedecker, Prince Bay, N. Y., and Lansing M. Hinrichs, Wilmette, Ill., assignors to The Bastian-Blessing Company, Chicago, Ill., a corporation of Illinois Application February 5, 1947, Serial No. 726,568

4 Claims. (Cl. 110—22)

This invention relates generally to blowpipes and more particularly to an improved apparatus for the flame cutting of metal bodies.

Various attempts have been made in the past to increase the heat of cutting blowpipe flames in order to cut nonferrous metals. One such development is the oxygen lance in which an iron pipe is fitted to a hose connected to a source of oxygen under pressure and the end of the pipe ignited by heating so that it burns in the stream of oxygen which emerges. This apparatus will cut nonferrous metals such as copper or brass, but it is very difficult to make a neat cut along a straight line or a narrow kerf. Consequently much metal is wasted by such an apparatus which is suitable at best for only very crude work.

Attempts have been made by others to inject iron particles such as powder or filings into a flowing stream of cutting oxygen in a blowpipe, but they have not been too successful in that the gas passages within the blowpipe and particularly the blowpipe tip are likely to become clogged with the metal particles which cut down the flow of gas through the tip, making it difficult to maintain a proper flame.

The development of improved stainless steels in recent years which, because of their oxidation resistant properties, cannot be cut by conventional flame cutting apparatus and which are difficult to cut by sawing or other mechanical means has created a need for high temperature flame cutting apparatus using oxygen and acetylene.

One object of this invention is therefore to provide a cutting blowpipe capable of producing high temperatures which is provided with means for injecting iron particles into the cutting flame, a novel arrangement of passages in the blowpipe tip being employed in order that the tip will not become clogged with metal particles.

Another object is to provide a cutting blowpipe and associated apparatus which may be adapted to inject other metal powders such as magnesium into the flame, or a Thermit mixture of iron oxide and aluminum.

Another object is to provide a cutting blowpipe in which a flowing stream of air, oxygen, nitrogen or other gas containing entrained metal particles is mixed with a stream of cutting oxygen, the relative rate of flow of each stream being adjustable for purposes of flame control.

Another object is to provide a cutting blowpipe which produces a plurality of conventional preheating flames surrounding a central cutting stream of oxygen containing metallic particles.

A further object is to provide a novel method of mixing metallic particles into a flowing stream of air or oxygen and then mixing this flowing stream with a second stream of oxygen in a blowpipe tip to form a cutting jet.

A further object is to provide a novel method of flame cutting or machining of ferrous or nonferrous metals which method is suitable for cutting stainless steels.

A further object is to provide a blowpipe tip which performs two mixing functions to supply preheat flames as well as a cutting jet containing oxidizable metal particles.

A further object is to provide a tip which is suitable for mounting in a conventional blowpipe with only minor alterations to the blowpipe being necessary.

Other and additional objects and features of novelty will be apparent to those familiar with the art on examination of the drawing, the specification and the appended claims.

In the drawing:

Fig. 1 is a schematic view of a blowpipe connected to gas cylinders and to the powder injector.

Fig. 2 is a longitudinal section of the blowpipe tip.

Fig. 3 is a longitudinal section of a modified form of the tip.

Fig. 4 is an enlarged partial sectional view of the injector apparatus.

Fig. 5 is a view of the front end of the tip of Fig. 2, and

Fig. 6 is a view of the rear end of the tip of Fig. 2.

The cutting blowpipe 10 is shown schematically in Fig. 1 to be connected to the gas cylinders 11, 12 and 13 by rubber hoses 15, 16 and 17. The blowpipe 10 is similar to conventional cutting blowpipes except that an extra needle valve 18 is provided at the rear end and an additional conduit 20 extends from this valve 18 forwardly through the handle 21 to the head 22. The head 22 is modified so that the additional conduit 20 terminates at the center of the socket 26 (indicated by broken lines). A tip 25 is shown inserted in the socket 26. The conduit 23 is connected through the lever valve 24 in the handle 21 to the hose 16 which extends to a pressure regulator 25 attached to the oxygen cylinder 12. The conduit 26 is connected by the hose 17 to a regulator 27 on an acetylene container 13.

The other cylinder 11 may contain air, oxygen or an inert gas and is connected to the powder injection apparatus 30 by a hose 31. The injector 30 (Fig. 4) comprises a funnel shaped hopper 33 having an airtight cover 34. The hopper 33 is mounted on a nozzle 35 supported in the short length of pipe 36. The orifice 37 of the nozzle 35 opens in the downstream direction in the pipe 36. A shutoff valve 39 is provided in the pipe upstream of the nozzle 35 and a second equalizer pipe 40 extends from the pipe 36 to the top of the hopper 33. The injector 30 operates as follows: Gas passing by the nozzle 35 aspirates powder 40 from the hopper 33 aided by gravity and the fact that gas pressure upstream of the nozzle 35 (which is greater than that downstream) is transmitted to the top of the hopper 33. The resulting mixture of gas and powder then passes through the hose 15 to the blowpipe 10. The amount of powder 40 sucked into the stream may be adjusted by varying the pressure setting of the regulator 28 and the rate of gas flow past the nozzle 35.

The blowpipe tip 25 is of novel construction as shown in Fig. 2. This tip 25 is preferably formed of copper or brass in order to have the properties of easy machinability to and be capable of rapidly conducting away heat in order that the downstream end will not become overheated during cutting operations. The tip 25 comprises a body portion 41 and an insert 42. The body 41 is cylindrical and is provided with a shoulder 43 for holding it in the socket 26 in the blowpipe head 22. The rear end of the body 41 is tapered to a conical shape so that it will fit in to the socket 23. The annular grooved portion 44 cut in to the body 41 is in communication with the acetylene conduit 26 in the head 22 when the tip is inserted. A plurality of preheat passages 45 are drilled through the body 41 parallel to its long axis and extend from the preheat ports 46 at the front of the body 41 to the rear end. The short passages 47 (one for each preheat passage) extend inwardly from the groove 44 to the preheat passages 45.

The core insert 42 is formed from a length of externally fluted rod, and the spaces left between adjacent flutes when the core is driven into a cavity 48 drilled into the body 41 from the rear end form the oxygen passages 50. The rear end of the core is tapered to a conical shape on the same angle as the body 41 and when the core is inserted a second annular groove 51 results at the rear end of the body 41. The rear ends of the preheat passages 45 and the fluted oxygen passages 50 terminate in this groove 51. The core 42 is not quite driven home in the body 41 so that an inwardly sloping annular space 53 is left of the inner end of the core 42. The position of the core 42 is regulated by the shoulder indicated at 51 which bears against the rear end of the body 41 resulting in the groove 51. This space provides communication between the oxygen passages 50 and the central cutting stream passage 54 drilled through the forward end of the body 41.

A second central passage 55 slightly smaller in diameter than the passage 54 extends through the core 42. This passage connects with the conduit 20 in the blowpipe 10 when the tip 25 is inserted.

The operation of this blowpipe and tip is as follows: The regulators 25 and 27 on the oxygen and acetylene cylinders 12 and 13 are adjusted to deliver gas at proper pressures to the blowpipe 24. The needle valves 18 on the blowpipe are then opened so that the gases flow into the blowpipe 10. A by-pass passage (not shown) allows oxygen to flow past the lever valve 24 through the conduit 23 to the annular groove 51 in the tip 25. The size of the by-pass passage is such that the flow of oxygen is sufficient to maintain the preheat flame. Acetylene, whose flow is adjusted by the needle valve 17 passes through the conduit 26 to the groove 47 at the rear end of the tip. The streams of oxygen and acetylene mix in the preheat passages 45 and emerge from the ports 46 where they are burned to heat the metal piece 55 which is to be cut. Any oxygen passing through the oxygen passages 50 and the central passage 54 serves to intensify the preheat flames produced.

The valve 39 on the injector 30 is then opened allowing air from the cylinder to aspirate powder 40 into the stream. This mixed stream passes into the blow pipe 10 through the valve 18 and conduit 20 to the head 22. Here it enters the passage 55 passing into the passage 54 where it mixes with a small amount of oxygen flowing through the annular space 53. This slight flow is sufficient to keep powder from backing up into the oxygen passages 50. The slightly oxygen enriched stream then emerges from the end of the tip 25 at the center of the preheat flames.

By this time the metal piece 60 has been sufficiently preheated for a cut to be started so the lever valve 24 is opened allowing the full stream of cutting oxygen to flow to the tip 25 and into the passages 50. This stream mixes with the air metal powder stream and emerges from the passage 54 where the metal powder is ignited to produce an intense flame. The heat produced then melts the metal of the workpiece 60 partially burning it and otherwise the velocity of the stream serves to blow the molten metal away.

In some instances it has proved desirable to provide an additional valve in the handle 20 of the torch 10 in the conduit 20 operated by the lever 24 so that the air stream can be controlled from the torch rather than separately. When this is done the cutting oxygen stream and the stream containing the metal powder are turned on simultaneously when a cut is to be started.

In other instances it has proved desirable to use an oxygen stream to convey the metal powder rather than air. When this is done a more intense flame usually results. Powdered iron has proved most adaptable to this apparatus, but powdered magnesium, aluminum, and other chemically active metals have proved effective. As a general rule, it has been found that those metals whose oxides have higher heats of formation result in hotter flames.

The embodiment of the tip of this invention shown in Fig. 3 is similar to that of Fig. 2 except that a blowpipe 10 having a preheat mixer incorporated must be employed. In this tip 25$a$ the preheat passages 45$a$ terminate in the groove 44$a$ to which a premixed stream of oxygen and acetylene or other fuel is supplied. The shoulder 43$a$ of this tip 25$a$ is of slightly different form than that of Fig. 2, but either type may be used on either tip.

It will be obvious to those familiar with the art that various other changes or modifications such as the substitution of a different type of injector may be made without departing from the spirit of the invention whose scope is defined by the appended claims.

What we claim is:

1. A cutting blowpipe tip comprising an elongated body having a central passage therethrough for a gas containing solid metallic particles, a plurality of passages for oxygen surrounding and substantially parallel to said central passage, and an inclined annular passage connecting said plurality of passages with said central passage.

2. A cutting blowpipe tip comprising an elongated body having a central passage therethrough for a gas stream containing metal particles, a plurality of substantially parallel passages for oxygen surrounding said central passage extending from the rear end of said tip to a point intermediate its ends, and an inclined annular passage connecting said plurality of passages with said central passage, said central passage being larger in diameter downstream of said inclined passage.

3. A tip for use in conjunction with a cutting blowpipe in which powdered metal is employed to increase the flame temperature comprising an elongated body having an axial passage therethrough for gas containing entrained metal particles, a plurality of preheat passages substantially parallel to and surrounding said axial passage, a second plurality of passages for high pressure oxygen disposed between said axial passage and said preheat passages, said second plurality of passages extending from the upstream end of the tip to a point intermediate its ends, and an inwardly converging passage connecting said second plurality of passages with said axial passage at a point remote from the end of the tip.

4. A tip for use in conjunction with a cutting blowpipe in which powdered metal is employed to increase the flame temperature comprising an elongated body having an axial passage therethrough for gas containing entrained metal particles, a plurality of passages for high pressure oxygen substantially parallel to and surrounding said axial passage, said plurality of passages extending from the upstream end of the tip to a point intermediate its ends, and an inwardly converging passage connecting said second plurality of passages with said axial passage at a point remote from the end of the tip, said axial passage having a larger diameter from the point of juncture of said inwardly converging passage to the downstream end of said tip than the upstream portion thereof.

WOODROW S. BOEDECKER.
LANSING M. HINRICHS.

REFERENCES CITED

The following references are of record in the file of this patent:

UNITED STATES PATENTS

| Number | Name | Date |
|---|---|---|
| 968,350 | Harrison | Aug. 23, 1910 |
| 1,178,551 | Stolle et al. | Apr. 11, 1916 |
| 1,606,013 | Wulff | Nov. 9, 1926 |
| 2,181,095 | Ness | Nov. 21, 1939 |
| 2,210,402 | Gaines | Aug. 6, 1940 |
| 2,286,191 | Aitchison et al. | June 16, 1942 |
| 2,286,591 | Van Triest | June 16, 1942 |
| 2,367,316 | Skinner | Jan. 16, 1945 |

FOREIGN PATENTS

| Number | Country | Date |
|---|---|---|
| 549,781 | Germany | May 2, 1932 |
| 641/26 | Australia | Feb. 19, 1926 |

OTHER REFERENCES

Metals Handbook, 1939 pages 930-935, inclusive (particularly pages 933, 934) pub. by Amer. Soc. for Metals, Cleveland, Ohio. (Copy in Sci. Lib.)

Steel, Aug. 13 1945, pages 107, 152. (Copy in Scientific Library.)